United States Patent
Goor et al.

(10) Patent No.: US 7,238,335 B2
(45) Date of Patent: Jul. 3, 2007

(54) PROCESS FOR THE PREPARATION OF HYDROGEN PEROXIDE BY THE ANTHRAQUINONE CYCLIC PROCESS

(75) Inventors: Gustaaf Goor, Hanau (DE); Eugen Staab, Hösbach (DE); Jürgen Glenneberg, Offenbach (DE)

(73) Assignee: Degussa AG, Düsseldorf (DE)

( * ) Notice: Subject to any disclaimer, the term of this patent is extended or adjusted under 35 U.S.C. 154(b) by 336 days.

(21) Appl. No.: 10/912,757

(22) Filed: Aug. 6, 2004

(65) Prior Publication Data

US 2005/0069483 A1 Mar. 31, 2005

Related U.S. Application Data

(60) Provisional application No. 60/494,557, filed on Aug. 13, 2003.

(30) Foreign Application Priority Data

Aug. 11, 2003 (DE) ................. 103 36 852

(51) Int. Cl.
*C01B 15/023* (2006.01)
(52) U.S. Cl. ............... 423/588; 423/589; 423/590
(58) Field of Classification Search ........ 423/588, 423/589, 590
See application file for complete search history.

(56) References Cited

U.S. PATENT DOCUMENTS

| 2,739,875 A | | 3/1956 | Sprauer et al. ............ 23/207 |
|---|---|---|---|
| 2,901,490 A | * | 8/1959 | Sprauer ................. 552/265 |
| 2,901,491 A | | 8/1959 | Eller et al. ............... 260/369 |
| 2,940,987 A | * | 6/1960 | Eller, Jr. et al. ........... 552/265 |
| 3,055,838 A | | 9/1962 | Moore ................. 252/182 |
| 3,179,672 A | | 4/1965 | Herzog et al. ............ 260/369 |
| 3,295,928 A | * | 1/1967 | Howe et al. ............. 423/589 |
| 3,432,267 A | * | 3/1969 | Lee et al. ............... 423/588 |
| 3,912,766 A | | 10/1975 | Logan et al. ............ 260/369 |
| 3,949,063 A | * | 4/1976 | Coingt et al. ............ 423/588 |
| 3,965,251 A | * | 6/1976 | Shin et al. .............. 423/588 |
| 4,668,436 A | * | 5/1987 | Sethi .................... 552/208 |
| 4,668,499 A | * | 5/1987 | Rushmere .............. 423/588 |
| 4,824,609 A | * | 4/1989 | Sethi .................... 552/265 |
| 6,103,917 A | * | 8/2000 | Le Loarer et al. ......... 552/208 |
| 6,224,845 B1 | * | 5/2001 | Pennetreau et al. ....... 423/584 |
| 7,001,584 B2 | * | 2/2006 | Nystrom et al. .......... 423/588 |
| 2003/0181741 A1 | | 9/2003 | Aksela et al. ........... 552/208 |

FOREIGN PATENT DOCUMENTS

| DE | 1 138 743 | 6/1959 |
|---|---|---|
| DE | 1 203 237 | 3/1962 |
| DE | 1 273 499 | 7/1964 |
| EP | 1 245 534 A2 | 10/2002 |
| FR | 1.305.640 | 9/1961 |
| FR | 1.342.577 | 12/1962 |
| GB | 838939 | 6/1960 |

* cited by examiner

*Primary Examiner*—Wayne A. Langel
(74) *Attorney, Agent, or Firm*—Michael A. Sanzo; Law Office of Michael A. Sanzo, LLC

(57) ABSTRACT

The invention concerns a process for the preparation of hydrogen peroxide by the anthraquinone cyclic process. The process includes a regeneration stage in which working solution is regenerated by being brought into contact with an aqueous solution containing an alkyl anthrahydroquinone and/or an alkyl tetrahydroanthrahydroquinone in deprotonated form. The working solution regenerated in the regeneration stage is returned to the cyclic process.

16 Claims, No Drawings

PROCESS FOR THE PREPARATION OF HYDROGEN PEROXIDE BY THE ANTHRAQUINONE CYCLIC PROCESS

CROSS REFERENCE TO RELATED APPLICATIONS

The present application claims priority to German application no. 103 36 852.3, filed Aug. 11, 2003, and U.S. provisional application No. 60/494,557, filed Aug. 13, 2003, which are incorporated in their entirety herein by reference.

FIELD OF THE INVENTION

The invention is directed to a process for the preparation of hydrogen peroxide by the anthraquinone cyclic process. The process includes a step in which working solution is regenerated by being brought into contact with an aqueous solution containing an alkyl anthrahydroquinone and/or an alkyl tetrahydroanthrahydroquinone in deprotonated form. The regenerated working solution is then returned to the anthraquinone cyclic process.

BACKGROUND

In the anthraquinone cyclic process for the preparation of hydrogen peroxide, one or more alkyl anthraquinones and/or alkyl tetrahydroanthraquinones are used as the reactants, to form hydrogen peroxide in a cyclic process. Reactants are used in the form of a "working solution" comprising one or more water-immiscible solvents.

In the first stage working solution is hydrogenated with hydrogen or a hydrogen-containing gas in the presence of a catalyst. This results in the quinones present being at least partially converted into the hydroquinone form. In a second stage, the working solution is reacted with an oxygen-containing gas, e.g. air, to cause the hydroquinones to form hydrogen peroxide accompanied by the reformation of quinones. In the third stage, the hydrogen peroxide dissolved in the working solution is extracted with water to form an aqueous hydrogen peroxide solution. Finally, the extracted, oxidized working solution (which, in practical terms no longer contains any hydrogen peroxide), is returned to the first, hydrogenation, stage.

During the cyclic process described above, small amounts of by-products are produced from the reactants, preventing them from continuing to form hydrogen peroxide. In the case of working solutions containing alkyl tetrahydroanthraquinones, for example, alkyl tetrahydroanthraquinone epoxides are formed as by-products. In order to minimize the loss of reactant due to by-product formation, the anthraquinone cyclic process may be performed with an additional regeneration stage in which all or part of the by-products are converted back into active reactants.

There have been a number of reports discussing various aspects of the regeneration step. For example, it is known that regeneration of the working solution can be achieved by treatment with alkalizing solids such as: $Al_2O_3$ and MgO (U.S. Pat. No. 2,739,875), CaO and $Ca(OH)_2$ (GB 838,939), sodium aluminum silicates (U.S. Pat. No. 3,055,838), and alkali-treated solids (FR 1 305 640). DE 12 73 499 disclosed that regeneration with a basic solid is more effective with a hydrogenated working solution than with an oxidized working solution.

All regeneration processes which utilize a solid regenerant have the disadvantage that acid degradation products contained in the working solution cause the activity of the regenerant to decrease within a short period of time. As a result used regenerant must be replaced with fresh regenerant at frequent intervals and disposed of in a procedure that is both cumbersome and expensive.

It is known from DE-A 11 38 743 that an oxidized and extracted working solution can be regenerated by treatment with oxygen or another oxidizing agent, such as $H_2O_2$, in the presence of an aqueous solution of a base.

DE-A 12 03 237 describes how oxidized and extracted working solution can also be regenerated in the absence of an oxidizing agent by treatment with an alkali hydroxide or aqueous lye. This reference indicates that the recycle solution should be treated after full oxidation to prevent dissolution of the hydroquinones in the aqueous phase.

U.S. Pat. No. 2,901,491 describes how the hydroquinones in a hydrogenated working solution are extracted from it in full with sodium hydroxide solution. By oxidizing the aqueous extract with air, the extracted hydroquinones can be converted back into the quinones, which then separate out or can be extracted with a solvent. The working solution extracted with sodium hydroxide solution may be distilled to recover solvents.

FR 1,342,577 describes the regeneration of working solution with a highly alkaline dithionite solution. The reactants contained in the working solution are extracted almost completely from the organic phase with this solution. After phase separation, the organic phase is recovered by distillation. The aqueous phase obtained during the treatment is oxidized, e.g., by passing air through it, thereby causing the reactants to separate out in the form of quinones. The treatment has a regenerative effect since, after treatment, the quantity of quinones obtained is greater than that in the working solution originally used. A disadvantage of the process, however, is that it consumes large amounts of dithionite and requires an additional distillation stage.

SUMMARY OF THE INVENTION

The object of the present invention is to provide an improved process for the preparation of hydrogen peroxide by the anthraquinone cyclic process with a regeneration stage. The process utilizes a working solution containing at least one alkyl anthraquinone and/or alkyl tetrahydroanthraquinone. It includes the following stages:
(i) catalytic hydrogenation of the working solution,
(ii) oxidation of the hydrogenated working solution obtained in stage (i) with an oxygen-containing gas,
(iii) aqueous extraction of hydrogen peroxide from the oxidized working solution obtained in stage (ii).

The extracted working solution obtained in stage (iii) is returned to stage (i). In addition, there is a periodically or continuously performed regeneration stage, in which the working solution from stage (i), (ii) or (iii) is brought into contact with an aqueous regenerating solution L1, containing at least one alkyl anthrahydroquinone and/or alkyl tetrahydroanthrahydroquinone in deprotonated form. A phase separation is then carried out which divides the resulting solution into a working solution phase P1 that is returned to the anthraquinone cyclic process and an aqueous phase P2.

DETAILED DESCRIPTION OF THE INVENTION

The process according to the invention for the preparation of hydrogen peroxide by the anthraquinone cyclic process comprises the following stages in the cyclic process:

(i) catalytic hydrogenation of the working solution,
(ii) oxidation of the hydrogenated working solution obtained in stage (i) with an oxygen-containing gas and
(iii) aqueous extraction of the hydrogen peroxide from the oxidized working solution obtained in stage (ii).

The cycle is completed by the return of the extracted oxidized working solution obtained in stage (iii) to stage (i).

The working solution used in the process contains as reactant one or more alkyl anthraquinones and/or alkyl tetrahydroanthraquinones dissolved in a solvent system consisting of one or more water-immiscible solvents. Any alkyl anthraquinones known for the anthraquinone cyclic process can be used as a reactant. 2-alkyl anthraquinones, such as, e.g., 2-methyl, 2-ethyl, 2-n-propyl, 2-iso-propyl, 2-n-butyl, 2-sec.-butyl, 2-tert.-butyl, 2-iso-sec.-amyl, 2-n-tert.-amyl, 2-neopentyl or 2-(4-methylpentyl) anthraquinone, are preferred. Mixtures of reactants containing alkyl anthraquinones and alkyl tetrahydroanthraquinones are particularly preferred.

Any solvent or solvent combination known for the anthraquinone cyclic process can be used for the working solution. Preferably the working solution includes a nonpolar solvent, such as, e.g., an aromatic benzine comprising polyalkylated benzenes and a polar solvent. Preferred polar solvents include: secondary alcohols (e.g., diisobutylcarbinol); esters (e.g., methyl cyclohexyl acetate); phosphoric acid esters (e.g., tris-(2-ethylhexyl) phosphate); tri- and tetrasubstituted ureas (e.g., tetrabutyl urea); pyrrolidones; carbamates; and N-alkyl caprolactams (e.g., N-octyl caprolactam).

In the hydrogenation stage of the process, i.e., stage (i), the working solution is reacted with a hydrogen-containing gas, preferably pure hydrogen, in the presence of a heterogeneous hydrogenating catalyst. As a result, the reactant(s) are converted in full or in part from the quinone form into the hydroquinone form. Any hydrogenating catalyst that has been successfully used for the anthraquinone cyclic process can also be used in the present invention. Noble metal catalysts containing one or more metals from the series Pd, Pt, Ir, Rh and Ru are preferred, with catalysts containing palladium as the principal component being particularly preferred.

The process may use either fixed-bed catalysts or suspended catalysts. Suspended catalysts may be either in the form of an unsupported catalyst, e.g., palladium black or Raney nickel, or in the form of a supported suspended catalyst. $SiO_2$, $TiO_2$, $Al_2O_3$ and mixed oxides thereof, as well as zeolites, $BaSO_4$ or polysiloxanes, are preferably used as support materials for fixed-bed catalysts or supported suspended catalysts. Alternatively, catalysts in the form of monolithic or honeycombed moldings, the surface of which is coated with the noble metal, can be used.

Hydrogenation is preferably performed continuously, and can be carried out in a conventional hydrogenation reactor, such as, e.g., a stirred-tank reactor, tubular-flow reactor, fixed-bed reactor, loop reactor or air-lift pump reactor. The reactor can, if necessary, be equipped with distribution devices, such as, e.g., a static mixers or injection nozzles, to distribute the hydrogen in the working solution.

Hydrogenation is preferably performed at a temperature in the range of 20 to 100° C. and most preferably at 45 to 75° C. The pressure is preferably in the range from 0.1 MPa to 1 Mpa (absolute), most preferably at 0.2 MPa to 0.5 Mpa (absolute). Ideally, reactions are performed in such a way that the hydrogen introduced into the hydrogenation reactor is, essentially, entirely consumed in the hydrogenation stage.

The amount of hydrogen is preferably chosen so that between 30 and 80% of the total amount of reactant is converted from the quinone form into the hydroquinone form. If a mixture of alkyl anthraquinones and alkyl tetrahydroanthraquinones is used as the reactant, the amount of hydrogen is preferably chosen so that, in the hydrogenation stage, only the alkyl tetrahydroanthraquinones are converted into the hydroquinone form whereas the alkyl anthraquinones remain in the quinone form.

In the oxidation stage of the process, i.e., stage (ii), the hydrogenated working solution from stage (i) is reacted with an oxygen-containing gas, preferably air or oxygenated air. Any oxidation reactor that has been described as suitable for the anthraquinone cyclic process can also be used in the present invention. Bubble reactors, through which oxygen-containing gas and the working solution are passed cocurrently or countercurrently are preferred. The bubble reactors can either be free from internal devices or, preferably, contain internal devices in the form of packing or sieve plates. Oxidation is preferably performed at a temperature in the range from 30 to 70° C. and most preferably at 40 to 60° C. Oxidation should be performed with an excess of oxygen, so that, preferably, over 90%, and, most preferably, over 95% of the alkyl anthrahydroquinones and alkyl tetrahydroanthrahydroquinones contained in the working solution in hydroquinone form are converted to the quinone form.

In the extraction stage of the process, i.e., stage (iii), the oxidized working solution from stage (ii), which contains hydrogen peroxide in dissolved form, is extracted with an aqueous solution to produce an aqueous hydrogen peroxide solution and an extracted oxidized working solution, which in practical terms, no longer contains any hydrogen peroxide. Deionized water (which optionally also contains additives for stabilizing hydrogen peroxide, for adjusting the pH and/or for corrosion protection) is preferably used as the extracting agent for the hydrogen peroxide. Extraction may be performed in essentially any extractor known. Preferably, it is performed countercurrently in a continuous extraction column, with sieve-plate columns being the most preferred.

The process of the present invention also includes a periodically or continuously performed regeneration step in which working solution is brought into contact with an aqueous regenerating solution L1 containing at least one alkyl anthrahydroquinone and/or alkyl tetrahydroanthrahydroquinone in deprotonated form. A phase separation is then performed in which a regenerated working solution phase P1 and an aqueous phase P2 are obtained. The regenerated working solution phase P1 is returned to the anthraquinone cyclic process.

Both hydrogenated working solution from stage (i) of the anthraquinone cyclic process and extracted oxidized working solution from stage (iii) of the anthraquinone cyclic process can be regenerated in the regeneration stage. Mixtures of hydrogenated working solution from stage (i) and extracted oxidized working solution from stage (iii) can also be regenerated. Working solution is preferably removed from the anthraquinone cyclic process between stage (i) and stage (ii) and fed to the regeneration stage. The regenerated working solution phase P1 is then returned to the anthraquinone cyclic process, again between stage (i) and stage (ii). In a preferred embodiment of the invention, working solution is continuously removed from the anthraquinone cyclic process in a quantity ranging from 1 to 50% of the recycle stream, most preferably at 2 to 20%. The working solution removed is continuously fed to the regeneration stage. The term "recycle stream" refers to the amount of working solution which, after passing through stages (i), (ii) and (iii), is fed back to stage (i).

The regenerating solution L1 can be produced by dissolving one or more alkyl anthrahydroquinones and/or alkyl tetrahydroanthrahydroquinones in an aqueous, alkalizing solution. L1 is preferably produced by bringing hydrogenated working solution into contact with an alkalizing aqueous solution and extracting the reactants contained therein in hydroquinone form in part or in full into the aqueous regenerating solution. Solutions of alkali hydroxides or alkali carbonates are preferably used as alkalizing aqueous solutions, with sodium hydroxide solutions being preferred. L1 preferably contains the deprotonated alkyl anthrahydroquinones and/or alkyl tetrahydroanthrahydroquinones in a total concentration of at least 0.004 mol/l. If the total concentration is lower, regeneration takes place more slowly. The maximum concentration of deprotonated alkyl anthrahydroquinones and/or alkyl tetrahydroanthrahydroquinones can be up to the saturation concentration of these compounds.

In preferred embodiments, the working solution and the regenerating solution L1 are brought into contact with one another in a volume ratio ranging from 100:1 to 1:5, most preferably from 20:1 to 1:1. Regeneration may be performed at a temperature ranging from 20 to 150° C. and most preferably from 50 to 90° C. Working solution and regenerating solution may be brought into contact with one another for regeneration for a period of 0.5 to 100 minutes with 2 to 30 minutes being preferred. The working solution and the regenerating solution are mixed together intensively during the regeneration, for example, in an agitated tank or by means of a pump and a reaction loop, which optionally also contains internal mixing devices, such as static mixers. The working solution and L1 are brought into contact in the absence of oxidizing agents, in particular with air excluded, to avoid oxidation of the alkyl anthrahydroquinones and/or alkyl tetrahydroanthrahydroquinones present in the regenerating solution in deprotonated form.

Once the working solution and the regenerating solution have been brought into contact, a phase separation into the working solution phase P1 of the regenerated working solution and the aqueous phase P2 is performed. The phase separation can be performed by any known process for separating or removing two liquid phases. A coalescer, which contains a coalescence-promoting fibrous material, preferably material that is wetted by water and is resistant to aqueous alkaline solutions, is preferred for use in phase separation. Metallic fiber beds, in particular stainless steel fiber beds, are particularly preferred. The metallic fiber beds are preferably constructed as nonwoven fabrics, woven fabrics or knitted fabrics, with binder-free rolled or sintered nonwovens being particularly preferred. The coalescence-promoting fibrous material preferably has fibers with a diameter of 1 to 100 μm, more preferably 1 to 80 μm and most preferably 2 to 50 μm. The coalescers are preferably constructed in such a way that after passing through a bed made from the coalescence-promoting fibrous material the two-phase mixture is also passed through a woven fabric made from a hydrophobic polymer. Suitable hydrophobic polymers for this purpose are polyolefins, such as polyethylene or polypropylene, and fluoropolymers, such as polytetrafluoroethylene or polyvinylidene fluoride. In a particularly preferred embodiment the coalescer comprises cylindrical elements, through which the mixture passes from the inside out and which comprise an inner support core, an outer support fabric made from a hydrophobic polymer and a metallic fiber bed located between them.

All or part of the aqueous phase P2 that is obtained in the regeneration stage following phase separation is preferably returned to the regeneration stage and used for the further regeneration of working solution. Through the recycling of P2, the loss of reactants arising from extraction are kept to a minimum.

Part of the regenerating solution is preferably removed periodically or continuously in order to eliminate acid degradation products which dissolve in this solution. If regeneration is performed with hydrogenated working solution, an alkalizing aqueous solution, in particular a lye with a concentration of alkali hydroxide ranging from 0.025 to 5 mol/l, is preferably supplied to the regeneration stage in place of the eliminated regenerating solution. Sodium hydroxide solution with a concentration ranging from 0.1 to 2 mol/l is particularly preferred. The proportion of regenerating solution that is periodically or continuously eliminated and not returned to the regeneration stage is preferably on average 1 to 60% and, most preferably, 1 to 10%, of the aqueous phase P2.

Reactants dissolved in the portion of P2 eliminated from the regeneration stage are preferably recovered from it in full or in part and returned to the anthraquinone cyclic process. This can be done, for example, by oxidation of the solution with air or another oxidizing agent followed by filtration or extraction with a solvent. Oxidation and extraction can also take place simultaneously. In another embodiment the eliminated regenerating solution is neutralized with an acid and extracted with a solvent.

In a preferred embodiment, P2 is extracted with an extracted oxidized working solution in order to recover reactants and this working solution is then returned to the anthraquinone cyclic process. The extraction of eliminated regenerating solution with extracted oxidized working solution is preferably performed in the absence of air. The eliminated regenerating solution and the extracted oxidized working solution are preferably brought into contact with one another in a volume ratio of 1:2 to 1:100, particularly preferably 1:5 to 1:20, in order to recover the reactants from the regenerating solution. Surprisingly, the reactants contained in the eliminated regenerating solution can be extracted selectively with the extracted oxidized working solution, without the addition of an oxidizing agent or an acid, whereas acid degradation products from the anthraquinone cyclic process largely remain in the aqueous regenerating solution and can be eliminated from the process. The working solution used to recover reactants from the eliminated regenerating solution can be returned directly to the anthraquinone cyclic process. In a preferred embodiment, however, it is combined with the working solution phase P1 obtained in the regeneration stage and optionally subjected to other regeneration steps before being returned to the anthraquinone cyclic process.

The working solution P1 obtained in the regeneration stage following phase separation can be returned directly to the anthraquinone cyclic process without further treatment. However, P1 is preferably washed with an acidifying aqueous solution to prevent basic substances from entering the anthraquinone cyclic process and leading to disturbances in the process. Diluted mineral acid solutions, e.g., diluted nitric acid or diluted phosphoric acid, are preferably used in this washing step. Following washing with an acidifying aqueous solution, a further wash with water can optionally also be performed. In order to detect an undesirable entrainment of regenerating solution with the working solution phase P1, pH can be monitored in the acid wash and/or in a subsequent wash with water. In both the acid wash and in a subsequent water wash, coalescers can be used to separate the working solution phase from the aqueous phase.

In the most preferred embodiment, the working solution to be regenerated is removed between stage (i) and (ii). This working solution is then brought into contact with a regenerating solution in the ratio 20:1 to 1:1. In addition, 1 to 10% is eliminated from the aqueous phase P2 and treated with extracted oxidized working solution in order to recover reactants from the aqueous phase to be eliminated from the process.

In addition to the regeneration stage, the process of the present invention can also include a further treatment step, in which a part of the working solution is periodically or continuously brought into contact with aluminum oxide. Contact is preferably achieved by passing working solution through an aluminum oxide fixed bed, preferably at a temperature in the range from 30 to 90° C. The treatment with aluminum oxide can optionally be performed with oxidized extracted working solution removed from the cyclic process between stage (iii) and stage (i), or with hydrogenated working solution removed from the cyclic process between stage (i) and stage (ii). The treatment with aluminum oxide can take place independently of the regeneration stage, i.e., working solution is removed from the anthraquinone cyclic process, regenerated with aluminum oxide and returned to the anthraquinone cyclic process. In another embodiment the treatment with aluminum oxide is combined with regeneration by supplying the working solution phase P1 obtained in the regeneration stage for treatment with aluminum oxide, optionally after acid washing. In a combined application, the aluminum oxide can be used for a longer period before it needs to be replaced with fresh aluminum oxide than is the case in processes that do not include a regeneration stage.

EXAMPLES

Example 1

In an experimental plant for the preparation of hydrogen peroxide by the anthraquinone cyclic process, a working solution consisting of 0.26 mol/l 2-ethyl anthraquinone and 0.42 mol/l 2-ethyl tetrahydroanthraquinone in a solvent blend consisting of 71 vol. % aromatic benzine (blend of $C_9/C_{10}$ alkyl aromatics), 20 vol. % tetrabutyl urea and 9 vol. % tris-(2-ethylhexyl) phosphate is circulated continuously through the hydrogenation, oxidation and extraction process stages, the average length of one cycle being 3 h. In the hydrogenation stage, 0.31 mol/l 2-ethyl tetrahydroanthraquinone are converted to 2-ethyl tetrahydroanthrahydroquinone.

Following the hydrogenation stage, 12% of the recycle stream is diverted from the working solution cycle and fed to the regeneration stage. The diverted working solution is mixed with a regenerating solution L1, which has already been recycled several times, in the volume ratio 7:1 and is regenerated in a loop reactor at 70° C. with an average residence time of 10 min. The two-phase mixture that is obtained is continually withdrawn from the loop reactor and is separated by means of a coalescer into a working solution phase P1 and an aqueous phase P2. The aqueous phase P1 is continuously supplied to the loop reactor via a buffer vessel. At two-hourly intervals 0.94% of the regenerating solution is eliminated from the buffer vessel and is replaced with 0.25 N sodium hydroxide solution. This corresponds to an average elimination rate of 1.56 ml of regenerating solution per liter of regenerated working solution.

The working solution phase P1 is washed with an aqueous phosphoric acid solution having a pH between 1 and 2 and then with deionized water, a phase separation via coalescers being performed after each wash. The washed regenerated working solution is returned to the anthraquinone cyclic process ahead of the oxidation stage. Once an operating steady state is reached, the content of the most important by-product, 2-ethyl tetrahydroanthraquinone epoxide, is analyzed. The working solution supplied to the regeneration stage contains 4.0 g/l of the epoxide. The regenerated working solution returned to the cyclic process from the regeneration stage contains 3.0 g/l epoxide, i.e., 25% of the epoxide content is regenerated to 2-ethyl tetrahydroanthraquinone in a single passage through the regeneration stage.

Example 2

Example 1 is repeated with the following changes:

The size of the loop reactor is reduced, so that the average residence time in the regeneration stage is cut to 7.3 min. The elimination of regenerating solution takes place at intervals of 30 minutes with an average elimination rate of 4.6 ml of regenerating solution per liter of regenerated working solution. To keep the volume of regenerating solution constant, 8.4 ml 0.25 N sodium hydroxide solution per liter of regenerated working solution are supplied to the buffer vessel. A treatment with aluminum oxide is also performed by removing 12% of the recycle stream of working solution from the anthraquinone cyclic process after the hydrogenation stage and passing it across a fixed bed of aluminum oxide at 70° C. On reaching an operating steady state the working solution supplied to the regeneration stage according to the invention contains 3.2 g/l epoxide and the regenerated working solution returned to the cycle contains 2.3 g/l epoxide, i.e., 28% of the epoxide content is converted in the single passage through the regeneration stage.

Example 3

Example 1 is repeated with a different working solution, consisting of 0.16 mol/l 2-ethyl anthraquinone, 0.20 mol/l 2-ethyl tetrahydroanthraquinone, 0.14 mol/l 2-amyl anthraquinone and 0.10 mol/l 2-amyl tetrahydroanthraquinone in a solvent blend consisting of 75 vol. % aromatic benzine and 25 vol. % tris-(2-ethylhexyl) phosphate. In the hydrogenation stage of the anthraquinone cyclic process, 0.26 mol/l of quinones are converted into hydroquinones.

As in Example 2 the residence time in the regeneration stage is 7.3 min and the elimination of regenerating solution takes place at intervals of 30 min. The average elimination rate for regenerating solution is 4.9 ml per liter of regenerated working solution. To keep the volume of regenerating solution constant, 6.1 ml 0.25 N sodium hydroxide solution per liter of regenerated working solution are supplied to the buffer vessel. Over 30 days a constant content of 2-ethyl tetrahydroquinone epoxide of 1.8 g/l and of 2-amyl tetrahydroquinone epoxide of 5.8 g/l becomes established in the working solution and does not then increase any further, i.e., the formation of epoxides and their conversion by regeneration balances each other.

Example 4

Example 3 is repeated using a continuously operated stirred-tank reactor with an average residence time of 28 min in place of the loop reactor in the regeneration stage. Working solution and regenerating solution are continuously supplied to the stirred-tank reactor in the volume ratio 5:1. The hydrogenated working solution used in the regeneration contains 0.26 wt. % 2-ethyl tetrahydroanthraquinone epoxide and 0.88 wt. % 2-amyl tetrahydroanthraquinone epoxide. After being brought into contact with the regenerating solution the content of 2-ethyl tetrahydroanthraquinone epoxide is 0.17 wt. % and the content of 2-amyl tetrahydroanthraquinone epoxide is 0.82 wt. %. The regenerating solution is continuously eliminated at a rate of 7.5 ml per liter of regenerated working solution. Eliminated regenerating solution is replaced with 0.325 N sodium hydroxide solution.

With air excluded, the regenerating solution eliminated from the regeneration stage from the aqueous phase P2 is continuously brought into contact in the volume ratio 1:3.75 with extracted oxidized working solution, which is removed from the anthraquinone cyclic process after the extraction stage and extracted. Following phase separation, the working solution phase is returned to the anthraquinone cyclic process ahead of the hydrogenation stage.

Before extraction with the extracted oxidized working solution, the regenerating solution contains 0.30 wt. % 2-ethyl tetrahydroanthrahydroquinone in deprotonated form. Following extraction with the working solution, the content of 2-ethyl tetrahydroanthrahydroquinone in the aqueous regenerating solution eliminated from the process is 0.01 wt. %.

SUMMARY

Examples 1 to 3 show that the process according to the invention can advantageously be performed with a regeneration of hydrogenated working solution. Example 4 shows that the reactant dissolved in deprotonated form in the regenerating solution eliminated from the process according to the invention can easily be recovered from it by extraction with extracted oxidized working solution. Surprisingly this selective extraction can also be performed in the absence of acid or of oxidizing agents, such as oxygen or hydrogen peroxide.

All references cited herein are fully incorporated by reference. Having now fully described the invention, it will be understood by those of skill in the art that the invention may be performed within a wide and equivalent range of conditions, parameters and the like, without affecting the spirit or scope of the invention or any embodiment thereof.

What is claimed is:

1. A process for the preparation of hydrogen peroxide by the anthraquinone cyclic process using a working solution containing as reactant at least one alkyl anthraquinone and/or alkyl tetrahydroanthraquinone, comprising the following steps:
    a) catalytically hydrogenating said working solution;
    b) oxidizing the hydrogenated working solution obtained in step a) with an oxygen-containing gas;
    c) performing an aqueous extraction of the hydrogen peroxide from the oxidized working solution obtained in step b)
    d) returning the extracted working solution obtained in step c) to step a) in a recycle stream;
    e) either periodically or continuously performing a regeneration step, comprising:
        i) contacting the hydrogenated working solution of step a) or the oxidized extracted working solution of step c) with an aqueous regenerating solution, L1, containing at least one alkyl anthrahydroquinone and/or alkyl tetrahydroanthrahydroquinone in deprotonated form to produce an L1/working solution mixture;
        ii) separating the L1/working solution mixture of step i) into a working solution phase, P1, and an aqueous phase, P2; and
        iii) returning the working solution phase P1 to the anthraquinone cyclic process.

2. The process of claim 1, wherein:
    a) hydrogenated working solution is removed from the anthraquinone cyclic process between step a) and step b), and is used in said regeneration step; and
    b) the regenerated working solution phase P1 produced as a result of a) is returned to the anthraquinone cyclic process between step a) and step b).

3. The process of claim 2, further comprising returning all or part of said aqueous phase P2 to said regeneration step for the further regeneration of working solution.

4. The process of claim 3 wherein only part of said aqueous phase P2 is returned to said regeneration step and wherein a lye solution with a concentration of alkali hydroxide in the range of 0.025 to 5 mol/l is supplied to the regeneration step in place of the quantity of P2 that is not returned.

5. The process of any one of claims 1-4, wherein the total concentration of said one or more alkyl anthrahydroquinones and/or alkyl tetrahydroanthrahydroquinones in deprotonated form in said aqueous regenerating solution, L1, is at least 0.004 mol/l.

6. The process of any one of claims 1-4, wherein, in step e), part i), the volume ratio of said hydrogenated working solution of step a) or oxidized extracted working solution of step c), relative to said aqueous regenerating solution, L1, is in the range 100:1 to 1:5.

7. The process of any one of claims 1-4, wherein, in step e), part i), the volume ratio of said hydrogenated working solution of step a) or oxidized extracted working solution of step c), relative to said aqueous regenerating solution, L1, is in the range 20:1 to 1:1.

8. The process of any one of claims 1-4, wherein hydrogenated working solution of step a) or oxidized extracted working solution of step c), is continuously removed from the anthraquinone cyclic process in an aggregate quantity ranging from 1 to 50% of said recycle stream and supplied to said regeneration step.

9. The process of any one of claims 1-4, wherein hydrogenated working solution of step a) or oxidized extracted working solution of step c), is continuously removed from the anthraquinone cyclic process in an aggregate quantity ranging from 2 to 20% of the recycle stream, and supplied to said regeneration step.

10. The process of any one of claims 1-4, further comprising contacting said working solution phase P1 with an acidifying aqueous solution before returning it to the anthraquinone cyclic process.

11. The process of any one of claims 1-4, further comprising recovering reactants dissolved in said aqueous phase, P2, and returning said reactants to the anthraquinone cyclic process.

12. The process according of claim 11, wherein the recovery of said reactants is accomplished by extracting P2 with said oxidized extracted working solution of step c).

13. The process of any one of claims 1-4, wherein, in step e), part ii), phase separation is performed using a coalescer comprising a coalescence-promoting fibrous material.

14. The process of claim 13, wherein a bed of metallic fibers is used as said coalescence-promoting fibrous material.

15. The process of claim 14, wherein said metallic fibers are stainless steel.

16. The process of any one of claims 1-4, further comprising periodically or continuously contacting either the hydrogenated working solution of step a) or oxidized extracted working solution of step c) with aluminum oxide.

* * * * *